Sept. 22, 1925.
J. H. WHITE
1,554,934
INSECT COLLECTOR AND POISON DISTRIBUTOR
Filed July 23, 1924     3 Sheets-Sheet 1
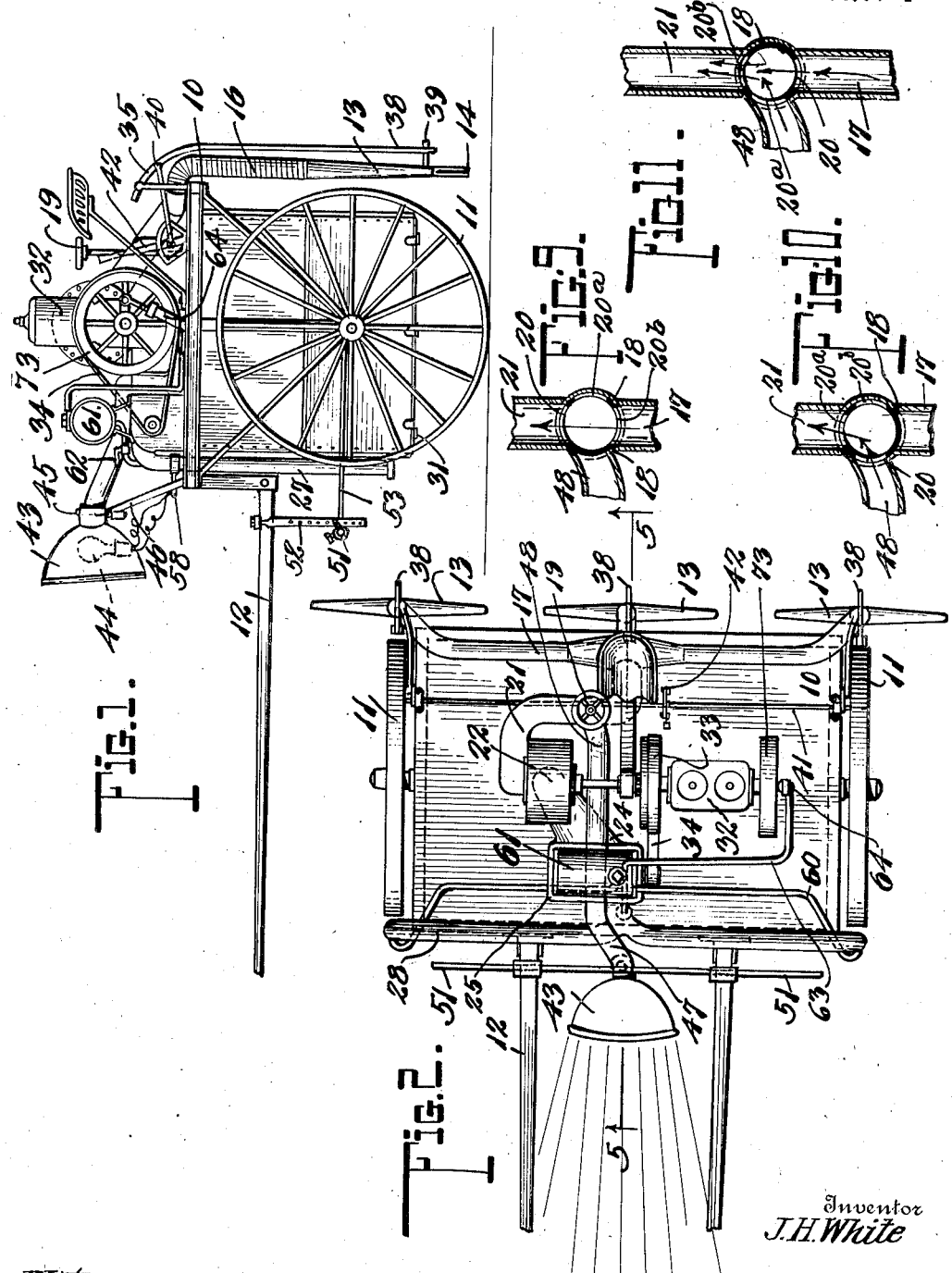
Inventor
J. H. White
Witness:
E. Wagner
By
Robb Robb & Hill
Attorneys Sept. 22, 1925.

J. H. WHITE 1,554,934

INSECT COLLECTOR AND POISON DISTRIBUTOR

Filed July 23, 1924

Sept. 22, 1925.  
J. H. WHITE  
INSECT COLLECTOR AND POISON DISTRIBUTOR  
Filed July 23, 1924  
1,554,934  
3 Sheets-Sheet 3
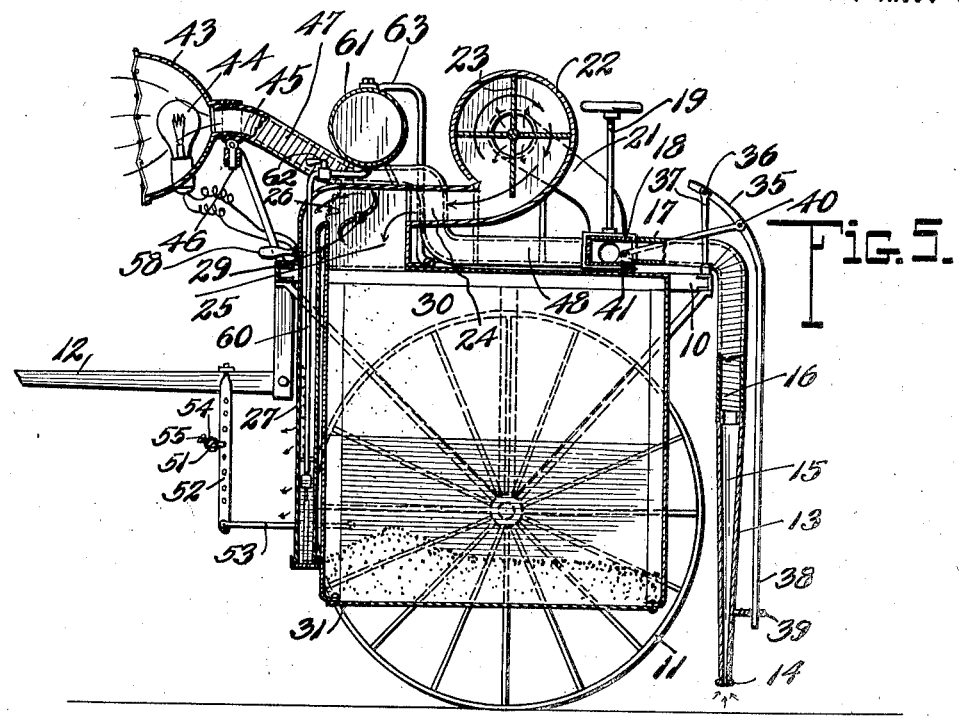
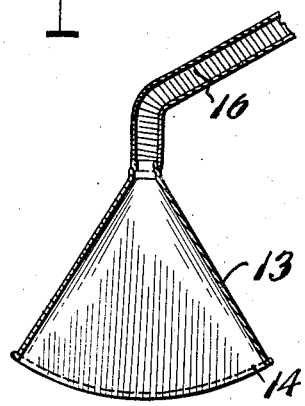
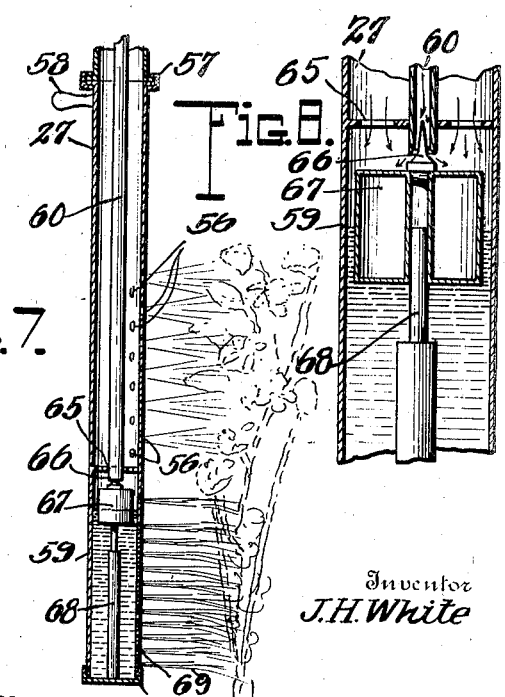

Patented Sept. 22, 1925.

1,554,934

UNITED STATES PATENT OFFICE.

JAMES HOSMER WHITE, OF DETROIT, ALABAMA.

INSECT COLLECTOR AND POISON DISTRIBUTOR.

Application filed July 23, 1924. Serial No. 727,773.

*To all whom it may concern:*

Be it known that I, JAMES H. WHITE, a citizen of the United States, residing at Detroit, in the county of Lamar and State of Alabama, have invented certain new and useful Improvements in Insect Collectors and Poison Distributors, of which the following is a specification.

This invention relates to an insect collector and poison distributor, and particularly to a construction adapted for use in eradicating boll weevil and other cotton pests, and embodies the use of an air suction for collecting such insects and a pressure means for distributing poison upon the plants.

The damage and loss of crops particularly in the cotton fields, due to the boll weevil and other insects, has been so material that various apparatus have been used in an attempt to destroy and collect such insects and it has been found most efficacious to first remove the insects from the plant by agitation of the foliage and collect such removed insects by a suction device while the plants should be further sprayed with a proper insecticide or poison to prevent the propagation of further injurious insect life thereon.

In practical use separate machines have been required for these several functions which embodies a multiplication of labor and time in the treatment of the plants which added materially to the expense incurred by the farmer. The present invention seeks to combine in a single apparatus means for the collection of the insects and the application of the poison adapted to be controlled by a unitary power device and also to provide for the collection of insects at night by the use of an illuminated attracting device connected for operation with the suction funnels disposed adjacent the plants.

The invention has for an object to provide a novel and improved construction comprising suction means combined with collecting funnels and an illuminated collector, such means being controlled by a valve device so that either or both may be used at will.

A further object of the invention is to provide means by which the discharge for the suction fan may be associated with a poison distributor to provide pressure for the proper distribution of the poison.

Another object of the invention is to provide a combined arrangement of the parts by which the collecting funnels are disposed at the rear of the vehicle and in communication with a suction fan which discharges the insects and collected solid material into a receptacle while the blast from this fan is discharged at the front of the vehicle where it may be utilized to remove insects from the plants or to apply a poison thereto.

Other and further objects and advantages of the invention will be hereinafter set forth and the novel features thereof defined by the appended claims.

In the drawings:

Figure 1 is a side elevation of the apparatus;

Figure 2 is a top plan thereof;

Figure 3 is a rear elevation;

Figure 4 is a front elevation thereof;

Figure 5 is a vertical section through the apparatus; on line 5—5 of Fig. 2;

Figure 6 is a detail section through the collecting funnel;

Figure 7 is a similar view through the poison distributor;

Figure 8 is a detail section of the controlling valve for such distributor;

Figures 9, 10 and 11 are detail sections showing different positions of the controlling valve for the suction applied to either the collecting funnels or the illuminated insect collector.

Like reference numerals refer to like parts throughout the several figures of the drawing.

The invention is adapted to be carried by any desired character of vehicle, either motor-propelled or otherwise, and for the purpose of illustration is herein shown as comprising a frame 10 supported by the traction wheels 11 in the usual manner. For the purpose of propelling this type of vehicle, shafts 12 are shown and at the rear thereof a plurality of collecting funnels 13 depend from the frame 10 and are disposed adjacent to the ground so as to collect insects therefrom at the base of the growing plants. A desirable arrangement of these funnels is shown in Figures 3 and 4 where two rows of plants are adapted to be treated simultaneously.

These funnels may be of any desired shape but are preferably flattened and of a segmental configuration to form a curved or arcuate collecting face 14 while the aperture within the funnel is enlarged upwardly as shown at 15 so as to create a strong suction at the receiving opening. These funnels are suspended by means of a flexible connection 16 from the pipe line 17 which as shown in Figure 3 is branched and provided with connections for the several flexible sections. The pipe 17 communicates with a controlling valve 18 provided with an operating shaft and handle 19. This valve may be of any preferred character but is specifically shown in Figures 9, 10 and 11 as comprising a three-way valve for a purpose which will be hereinafter described. This valve is provided with a port which communicates with a pipe 21 leading to the fan casing 22 within which any desired form of fan 23 is rotatably mounted for creating a suction through the several connected pipes.

The discharge or blast from this fan is carried by a pipe 24 to a relief chamber 25 which is provided at 26 with a screened opening communicating with a discharge pipe 27 preferably depending at the front of the machine as shown in Figure 4. A plurality of these pipes is provided and they are suitably connected by a lateral pipe 28 so that the discharge therethrough is substantially in alignment with the collecting funnels at the rear of the vehicle. The chamber 25 is also provided with a cleaning blade 29 rotatably mounted therein and disposed to remove insects or solid material which may adhere to the screen surface 26. The insects or solid material such as cotton squares which are removed or fall from the chamber 25 are collected in the receptacle 30 which is dependent from the frame and may be provided at its lower portion with a discharge door 31 for the removal of its contents when desired.

The fan 23 may be driven by any desired mechanism, the preferred form being a motor 32 carried by the frame and connected to drive the shaft of the fan. The blade 29 is also driven from this motor by means of a wheel 33 on the shaft thereof and belt 34 extending to the shaft of the blade 29. Under some conditions of use it is desirable to adjust the collecting funnels relative to the ground or the plants and this may be accomplished by means of a lever 35 pivoted at 36 upon a post 37 mounted on a fixed part and having its lower end 38 slidingly disposed in an apertured plate 39 carried by the funnel. This lever may be actuated by means of a link 40 extending therefrom to a crank shaft 41 provided with an operating handle 42 by which it may be adjusted and held in the usual manner as shown in Figure 1.

Combined with the insect collecting means before described I have provided means for adapting the machine for use at night and these comprise a collecting cone 43 provided with an illuminating means 44 such as an electric lamp supplied from any suitable source of power, and this cone is mounted for rotative adjustment by means of the pivot 45 disposed in a bracket 46 extending forward of the frame. The cone is connected by a flexible pipe 47 to the suction pipe 48 which communicates with the casing of the controlling valve 18. This valve is adapted to permit use of either or both of the collecting devices by an adjustment of its ports.

The valve 18 is provided with ports 20, 20$^a$ and 20$^b$, so that when in the position shown in Figure 9 the port 20 communicates with the fan suction and the port 20$^b$ with the nozzles alone, cutting off the suction to the illuminated cone. When shifted to the position shown in Figure 10 the port 20 communicates with the cone and the port 20$^a$ with the fan suction while communication with the collecting nozzles is cut off for instance for night use. In the further shifted position of Figure 11 each of these three ports communicates with the connecting pipes so that both the illuminating cone and nozzle are in communication with the fan suction. A further shifting of the valve will bring the solid wall opposite the fan connection thus cutting off suction from both collectors, for instance when it is desired to use the device as a poison distributor alone.

In connection with the collecting funnels it is desirable to knock or displace the insects from the plants prior to the collection thereof so that the foliage of the plants will not be affected by the suction from the nozzles which is intended to be applied at a point adjacent the ground. For this purpose an agitator bar 51 is adjustably mounted upon a hanger 52 depending from the frame, or from the shaft 12 as shown in Fig. 5 and suitably braced by a connection 53 at its lower end. By these means the bar 51 may be adjusted vertically to the proper height for engagement with the plants and it is also capable of a lateral or side adjustment by means of the connectors 54 in which the rod is adjustably mounted by a set screw 55, this connector being engaged with the apertures of the hanger 52.

The discharge pipe 27 for the fan blast is provided with outlet apertures 56 disposed to project a blast against the adjacent plants which also assists in removing therefrom any insects which are driven to the ground at the rear where they may be conveniently collected by the funnels. This discharge pipe is adjustably mounted by means of the coupling 57 so that through the operation of the handle 58 it may be rotated to control the direction of discharge therefrom as found most desirable. The lower portion of the discharge pipe is provided with a chamber 59 to receive an insecticide or poison which is conveyed thereto by a pipe 60 extending from a reservoir 61 at the upper portion of the apparatus and provided with a controlling cock 62. For the purpose of creating a pressure in this reservoir a line 63 communicates with a pump 64 having its piston rod connected to the wheel 73 for actuation thereby. The lower portion of the discharge pipe is formed with openings 65 communicating with the poison chamber while the discharge from the pipe 60 is controlled by a valve 66 carried by a float 67 disposed in the chamber 59 and guided in its movement by a post 68 within the chamber. This chamber is provided with spray openings 69 and a closure cap 70 by which access thereto is rendered convenient for the purpose of cleaning.

In operation, when the poison chamber has filled with liquid the float valve closes the intake from the reservoir and the pressure of the fan blast is exerted upon said liquid to provide the desired spray of insecticide upon the plant and immediately that the level of this liquid falls there is a continuous feed thereof from the reservoir in connection with the pressure of the discharge pipe. It will be understood that the connections from this reservoir are properly branched to provide a feed of the insecticide to the several discharge pipes, as indicated in Figure 4.

The invention presents a combined apparatus adapted for the collection of insecticides from plant growth either from the ground or by their attraction to an illuminated device and having a controlling valve permitting the use of either or both of the collecting members. The fan providing the power for collection purposes also utilizes the discharge or blast therefrom to agitate and remove the insects from plant growth and to act upon a body of the insecticide so as to produce a spraying action upon the plants, while an agitating bar is also provided in position to engage and agitate the plants so that the insects thereon will fall to the ground and adapted to be readily collected by the funnels at the rear of the receiving receptacle. These funnels are of a particular character adapted to prevent injury to the foliage of the plant by applying the suction thereto and the arcuate form of the funnels permits their application adjacent the ground intermediate of parallel rows of plants.

Provision is also made for the adjustment of these collecting funnels and also for the proper adjustment of the air and insecticide spray through a rotative movement of the discharge pipes which are aligned with the collecting funnels to prevent contact with the growing plants but apply a side spray thereon.

While the details of the construction have been specifically shown and described, the invention is not confined thereto as changes and alterations may be made without departing from the spirit of the invention as defined by the appended claims.

Having thus described my invention, what I claim as new is:—

1. In an apparatus of the class described, a receiving receptacle, a casing provided with a fan, a collecting device communicating with the suction of said fan, a relief chamber disposed in the discharge from said fan and having a perforated wall, a perforated discharge pipe communicating with said chamber at one side of said wall, and a rotatable blade disposed to cooperate with said wall and remove adhering material therefrom.

2. In an apparatus of the class described, a receiving receptacle, a fan casing thereon provided with a fan, a collecting device communicating with the suction of said fan, a depending tube having a perforated chamber at its lower portion, a reservoir for an insecticide, a discharge pipe from said reservoir extending to said chamber at the lower portion of the fan discharge pipe, and a liquid controlled valve mounted in said chamber to cooperate with the insecticide discharge.

3. In an apparatus of the class described, a receiving receptacle, a fan casing thereon provided with a fan, a collecting device communicating with the suction of said fan, a depending discharge pipe from said fan having a perforated chamber at its lower portion, a reservoir for an insecticide, a discharge pipe from said reservoir extending to said chamber at the lower portion of the fan discharge pipe, a liquid controlled valve mounted in said chamber to cooperate with the insecticide discharge, and means for rotatably adjusting the fan discharge pipe.

4. In an apparatus of the class described, a receiving receptacle, a collecting fan cooperating therewith and provided with a perforated depending discharge pipe, means for feeding an insecticide to a perforated chamber at the lower end of said pipe whereby the pressure in the discharge pipe will act upon the fluid in said chamber, and a float mounted in said chamber to cooperate with the insecticide feed pipe.

In testimony whereof I affix my signature.

JAMES HOSMER WHITE.